(12) United States Patent
Verma et al.

(10) Patent No.: US 12,273,753 B2
(45) Date of Patent: Apr. 8, 2025

(54) TEST CERTIFICATION SYSTEM FOR eSIM-ONLY WIRELESS DEVICES

(71) Applicant: Apple Inc., Cupertino, CA (US)

(72) Inventors: Rajeev Verma, San Jose, CA (US); Stanley M. Mayalil, San Jose, CA (US); Cole M. Stewart, San Jose, CA (US); Jae Oh Chung, San Jose, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 17/820,857

(22) Filed: Aug. 18, 2022

(65) Prior Publication Data

US 2023/0082676 A1 Mar. 16, 2023

Related U.S. Application Data

(60) Provisional application No. 63/261,188, filed on Sep. 14, 2021.

(51) Int. Cl.
*H04W 24/08* (2009.01)
*H04B 17/00* (2015.01)

(52) U.S. Cl.
CPC ........ *H04W 24/08* (2013.01); *H04B 17/0085* (2013.01)

(58) Field of Classification Search
CPC ..... H04W 24/08; H04W 8/183; H04W 24/06; H04W 60/04; H04W 84/042; H04W 12/06; H04W 72/569; H04W 76/11; H04W 72/04; H04W 4/50; H04W 12/08; H04B 17/0085; H04B 17/17; H04B 17/29; H04B 17/15; H04B 17/00
See application file for complete search history.

(56) References Cited

U.S. PATENT DOCUMENTS

| | | | |
|---|---|---|---|
| 9,949,113 B1 * | 4/2018 | Vasudevan | H04W 4/50 |
| 2010/0005476 A1 * | 1/2010 | Jayet | H04W 4/50 |
| 2012/0159253 A1 * | 6/2012 | Boisde | G06F 11/3656 |
| | | | 710/33 |
| 2016/0054989 A1 * | 2/2016 | Diebolt | G06F 8/65 |
| | | | 717/177 |
| 2023/0052559 A1 * | 2/2023 | Chen | G06F 11/3688 |

* cited by examiner

*Primary Examiner* — Lana N Le
(74) *Attorney, Agent, or Firm* — DICKINSON WRIGHT RLLP

(57) ABSTRACT

The described embodiments set forth techniques for testing a wireless device configured to use an embedded Universal Integrated Circuit Card (eUICC) and excluding a removable UICC card. A test apparatus processes application protocol data units (APDUs) for conformance with a standardized test specification, where the APDUs are provided by an eSIM command handler client application that interfaces with a baseband processor in communication with the eUICC that includes test profiles with test applets.

20 Claims, 8 Drawing Sheets

EXEMPLARY TEST SEQUENCE (OPEN/CLOSE CHANNEL)

| STEP | DIRECTION | MESSAGE / ACTION |
|---|---|---|
| 1 | USER → ME | Set and Configure URSP Rules with DNN "TestGp.rs" in the Terminal Configuration if required.<br>Always-on PDU Session Using DNN "Internet" is Configured in the Terminal.<br><br>*Configure eUICC with:*<br>*OPEN CHANNEL Proactive Command in EF_STK at Record 1*<br>*CLOSE CHANNEL Proactive Command in EF_STK at Record 2* |
| 2 | ME → NG-SS | ME Successfully REGISTER with NG-RAN Cell |
| 3 | ME → NG-SS | Always-on Internet PDU Session is Established Successfully<br><br>*Configure the EF_set_STK to Trigger Record 1* |
| 4 | EUICC → ME | Proactive Command Pending: OPEN CHANNEL |
| 5 | ME → EUICC | FETCH |
| 6 | EUICC → ME | Proactive Command: OPEN CHANNEL |
| 7 | ME → USER | ME may Display Channel Opening Information |
| 8 | ME → NG-SS | PDU SESSION ESTABLISH REQUEST sent to network |
| 9 | NG-SS → ME | PDU SESSION ESTABLISH ACCEPT |
| 10 | ME → EUICC | Terminal Response: OPEN CHANNEL<br><br>*Configure the EF_set_STK to Trigger Record 2* |
| 11 | EUICC → ME | Proactive Command Pending: CLOSE CHANNEL |
| 12 | ME → EUICC | FETCH |
| 13 | EUICC → ME | Proactive Command: CLOSE CHANNEL |
| 14 | ME → EUICC | Terminal Response: CLOSE CHANNEL |
| 15 | USER → ME | Wait 30 Seconds, then Switch off Terminal |

*FIG. 4*

TEST CERTIFICATION SYSTEM FOR eSIM-ONLY WIRELESS DEVICES

CROSS-REFERENCE TO RELATED APPLICATIONS

The present application claims the benefit of U.S. Provisional Application No. 63/261,188, entitled "TEST CERTIFICATION SYSTEM FOR eSIM-ONLY WIRELESS DEVICES," filed Sep. 14, 2021, the content of which is incorporated herein by reference in its entirety for all purposes.

FIELD

The described embodiments set forth techniques for testing a wireless device configured to use an embedded Universal Integrated Circuit Card (eUICC) and excludes a removable UICC card. A test apparatus processes application protocol data units (APDUs) for conformance with a standardized test specification, where the APDUs are provided through a client application, e.g., an embedded subscriber identity module (eSIM) handler, that interfaces with a baseband processor in communication with the eUICC that includes test profiles with test applets.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card or physical SIM (pSIM) card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more embedded SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. Some newer wireless devices that provide cellular wireless capability may exclude removable SIM cards entirely.

Test procedures developed for removable SIM cards to date are based on direct access to the physical interface of the removable SIM card. For eSIMs on eUICC cards, the interface between the eUICC and an external processor, such as a baseband processor can be difficult or impossible to connect with for testing purposes. With the continued growth of newer, eSIM-only wireless devices, there exists a need for secure and convenient test certification techniques.

SUMMARY

The described embodiments set forth techniques for testing a wireless device configured to use an embedded Universal Integrated Circuit Card (eUICC) and excludes a removable UICC card. One or more test profiles are loaded to the eUICC of the wireless device, each test profile including one or more test applets that when executed can cause the eUICC to provide specific application protocol data units (APDUs) via an external interface that connects with a baseband processor of the wireless device. The communication interface between the baseband processor and the eUICC is not directly accessed for testing. Instead, the baseband processor, in combination with a client application, e.g., an eSIM APDU command handler, resident on a processor of the wireless device or in an external apparatus, relays APDU commands and/or responses communicated between the baseband processor and the eUICC. The eSIM APDU command handler registers with the baseband processor to monitor APDU traffic between the baseband processor and the eUICC. The eSIM APDU command handler can reside in the baseband processor, in an external application processor or other processor of the wireless device, or in an external apparatus in communication with the wireless device. A test apparatus and/or a test individual can interact with the eSIM command handler to send specific APDU commands from the baseband processor to the eUICC and to receive and relay APDU commands and/or responses received from the eUICC. The test apparatus processes the APDU commands and/or responses for conformance with a standardized test specification. Test profiles included in the eUICC can emulate standardized test procedures. The test apparatus and/or the test individual can configure the eUICC with proactive APDU commands that can be triggered appropriately for the test procedure. In some embodiments, the APDU commands and/or responses are displayed on a user interface of the wireless device and relayed to the test apparatus by the test individual. In some embodiments, the received APDU commands and/or responses are relayed directly to the test apparatus without intervention of the test individual. In some embodiments, the received APDU commands and/or responses are relayed to the test apparatus via a separate external apparatus, with which the test individual and/or the test apparatus can interact. In some embodiments, the received APDU commands and/or responses are displayed on an interface of the external apparatus or on an interface of the test apparatus. In some embodiments, the eSIM command handler is restricted to provide visibility to APDU commands and/or responses that are specific to a test case being tested and for which the eSIM command handler has registered for access with the baseband processor. APDU commands and/or responses relayed to the test apparatus are processed and analyzed for correctness to determine whether the APDU traffic received from the eUICC conforms with the associated test specification. In some embodiments, the eSIM APDU command handler processes simultaneous APDUs communicated between the processor of the wireless device and multiple enabled profiles on the eUICC of the wireless device. In some embodiments, the eSIM APDU command handler resets an active profile on the eUICC to a set of default values as part of an initialization procedure before testing occurs.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 4 illustrates a table of an exemplary test sequence for communication channel operations, according to some embodiments.

DETAILED DESCRIPTION

Figure 1:
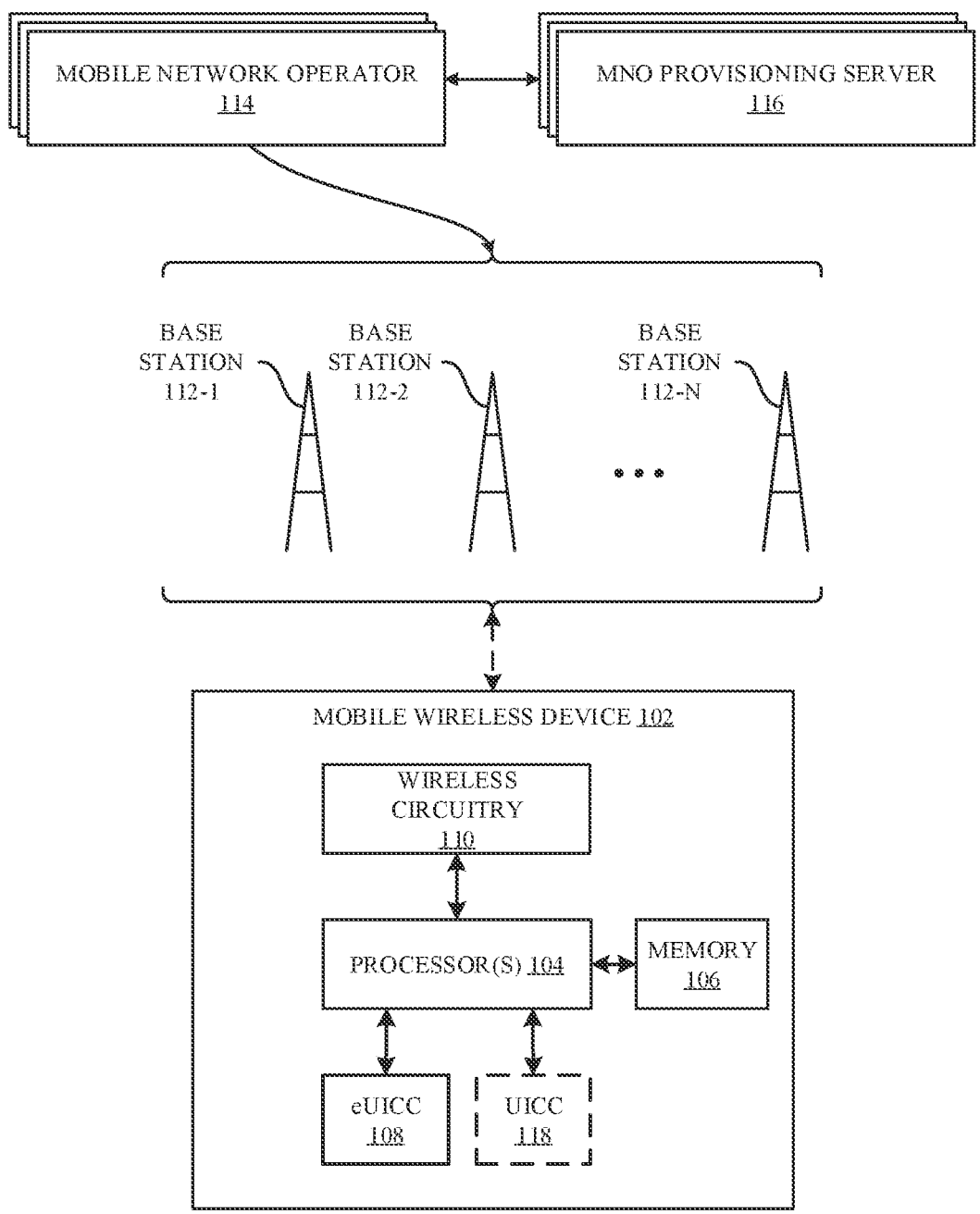
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for testing that a wireless device, configured to use an embedded Universal Integrated Circuit Card (eUICC) and excluding a removable UICC card, conforms to a standardized test specification. Certification testing occurs without direct access to an interface between a baseband processor of the wireless device and the eUICC of the wireless device. One or more test profiles are loaded to the eUICC of the wireless device. Each test profile can include one or more test applets that when executed can cause the eUICC to provide specific application protocol data units (APDUs) via an external interface that connects with a baseband processor of the wireless device. In some embodiments, a generic test profile with a generic test applet is pre-loaded to the eUICC of the wireless device, and subsequently a tester configures the generic test applet. The tester can configure the test applet to include content of specific, proactive APDU commands in a set of records of a first elementary file (EF), e.g., a SIM toolkit (STK) EF labeled EF_STK. The tester can also configure a second EF, labeled an EF_setSTK, that triggers one or more particular APDU commands in the set of records of the first EF, i.e., in the EF_STK. In some embodiments, a specific (pre-configured) test profile (or multiple specific test profiles) is pre-loaded to the eUICC of the wireless device for testing, the specific test profile includes specific test applets that include an EF_STK configured with proactive commands and an EF_setSTK that triggers the proactive commands. In some embodiments, a test applet of a test profile includes a set of call control responses in a call control EF. In some embodiments, a test applet of a test profile includes a set of events configured to execute in sequence, such as based on an input from a test apparatus or tester individual. In some embodiments, the test apparatus and/or the test individual configures a set of required elementary files (EFs) of one or more test applets of one or more test profiles and pre-loads the test profiles to the eUICC for testing in accordance one or more third generation partnership project (3GPP) and/or European Telecommunications Standards Institute (ETSI) test specifications, e.g., 3GPP TS 31.121 or 3GPP TS 31.124. In some embodiments, the test applet of the test profile can ignore certain communication by the baseband processor during testing, such as information regarding capabilities during initialization or content of other terminal responses from the baseband processor to the eUICC during testing.

The communication interface between the baseband processor and the eUICC is not directly accessed for testing. Instead, the baseband processor, in combination with a client application, e.g., an eSIM APDU command handler, resident on a processor of the wireless device, relays APDU commands and/or responses, communicated between the baseband processor and the eUICC, to a test apparatus. The eSIM APDU command handler registers with the baseband processor to monitor APDU traffic between the baseband processor and the eUICC. The eSIM APDU command handler can reside in the baseband processor, in an external application processor or other processor of the wireless device, or in an external apparatus that is in communication with the wireless device. The test apparatus and/or a test individual can interact with the eSIM command handler to send specific APDU commands from the baseband processor to the eUICC and to receive and relay APDU commands and/or responses (or other data traffic) received in response from the eUICC to the test apparatus for verification. The test apparatus processes the APDU commands and/or responses (or other data traffic) to determine conformance with a standardized test specification such as provided by 3GPP or ETSI. Test profiles included in the eUICC can emulate standardized test procedures. In some embodiments, the test apparatus parses data packets, communicated between the baseband processor and the eUICC and relayed to the test apparatus, directly or indirectly, by the eSIM command handler, and decodes the parsed data packets into user readable text to allow a tester individual to identify the APDU commands and/or responses exchanged between the baseband processor and the eUICC as part of a testing procedure. The test apparatus and/or the test individual can configure the eUICC with proactive APDU commands that can be triggered appropriately for the test procedure. In some embodiments, received APDU commands and/or responses are displayed on a user interface of the wireless device and relayed to the test apparatus by the test individual. In some embodiments, the received APDU commands and/or responses are relayed directly to the test apparatus without intervention of the test individual. In some embodiments, the received APDU commands and/or responses are relayed to the test apparatus via a separate external apparatus, with which the test individual and/or the test apparatus can interact. In some embodiments, the received APDU commands and/or responses are displayed on an interface of the test apparatus. In some embodiments, the received APDU commands and/or responses are displayed on an interface of the external apparatus. In some embodiments, the eSIM command handler is restricted to provide visibility to APDU commands and/or responses that are specific to a test case being tested and for which the eSIM command handler has registered for access with the baseband processor. APDU commands and/or responses relayed to the test apparatus are processed and analyzed for correctness to determine whether the APDU traffic received from the eUICC conforms with the associated test specification.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 is capable of including one or more physical UICCs 118, also referred to as Subscriber Identity Module (SIM) cards, in addition to the eUICC 108 but does not include a SIM card installed when testing the mobile wireless device 102. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple embedded SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel. For testing that the mobile wireless device 102 with the eUICC 108 conforms to a telecommunications standard, one or more test profiles, which can also be referred to as test eSIMs, can be loaded to the eUICC 108 of the mobile wireless device 102, where the test profiles include test applets with generic (and configurable) elementary files (EFs) or pre-configured EFs that can be executed to cause specific APDU commands and/or responses to be communicated between the eUICC 108 and an external processor 104, such as a baseband processor.

Figure 2:
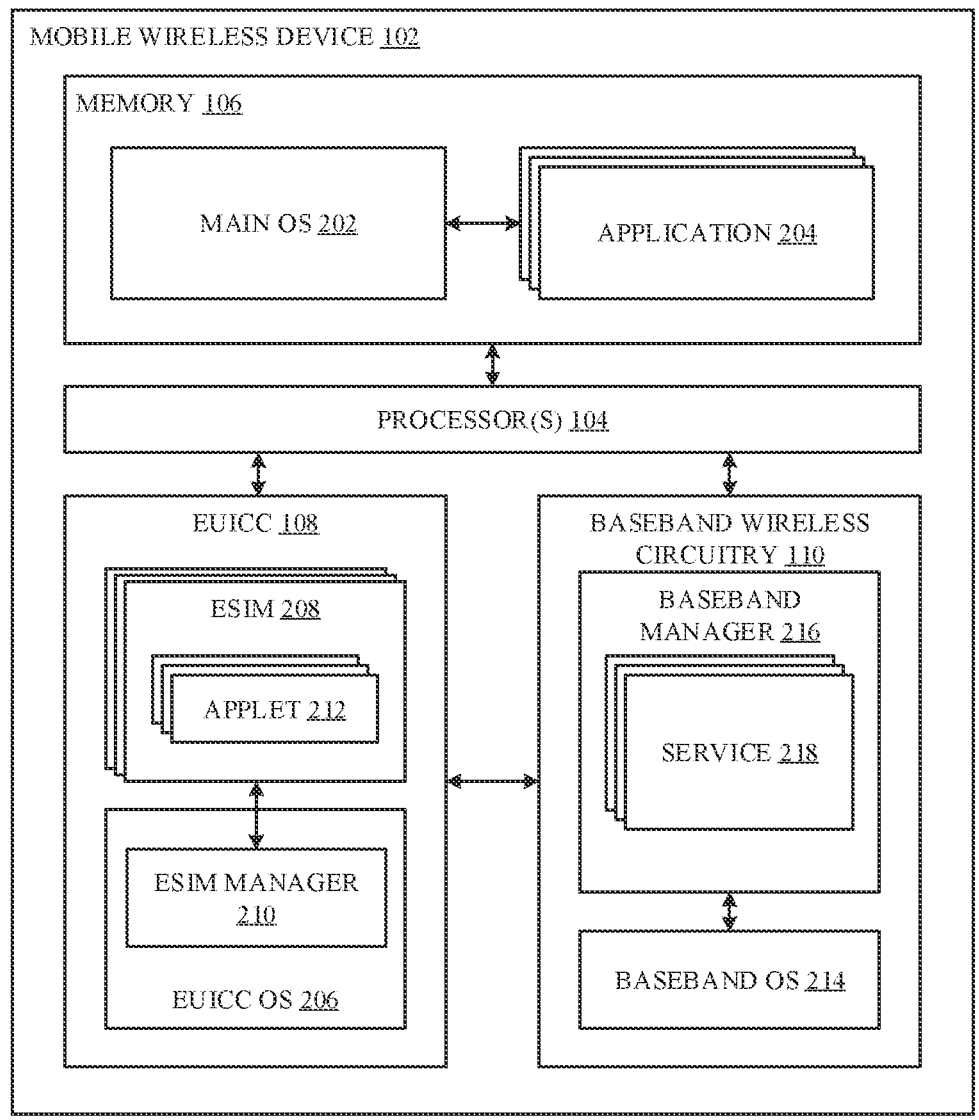
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102. A test eSIM 208 can include one or more test applets 212 that can be used for testing communication between the eUICC 108 and the baseband wireless circuitry 110 for conformance with one or more telecommunications test specifications.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
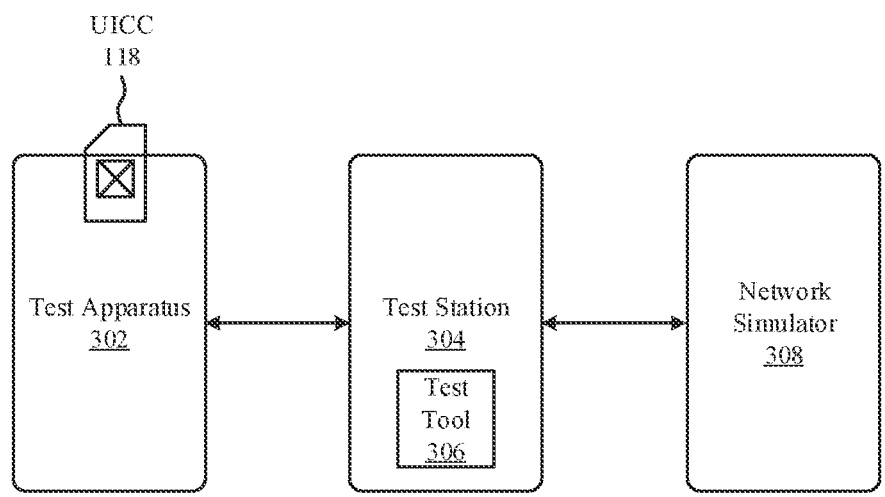
FIG. 3A illustrates an exemplary test setup for a removable SIM card equipped wireless device, according to some embodiments.

FIG. 3A illustrates a diagram 300 of an exemplary test setup for testing a UICC 118 (removable SIM card) of a mobile wireless device 102. The UICC 118 can be inserted into a test apparatus 302 that can interface directly with the UICC 118, where the test apparatus 302 can send and receive data traffic, e.g., APDU commands and/or responses, to and from the UICC 118. A test station 304 can be connected to the test apparatus 302 and include a test tool 306 that generates data, e.g., APDU commands and/or responses, to send to the test apparatus 302 for communicating with the UICC 118. The test station 304 can also receive data traffic, e.g., APDU commands and/or responses, received from the UICC 118 via the test apparatus 302, and the test tool 306 of the test station 304 can parse the data traffic to determine whether the UICC 118 responds in accordance with a test specification. The test station 304 can also communicate with a network simulator 308 that can interact with the test station 304 to simulate actions of a cellular wireless network, e.g., for establishing a mobile originated (MO) or mobile terminated (MT) call. Testing via the test setup illustrated in FIG. 3A requires access to the interface of the UICC 118 to send and receive data traffic directly to the UICC 118. Such testing is not feasible in an eSIM-only wireless device 102, as the interface between the eUICC 108 of the eSIM-only wireless device 102 and processors external to the eUICC 108, e.g., a baseband processor of baseband wireless circuitry 110, can be difficult or impossible to probe effectively.

Figure 3B:
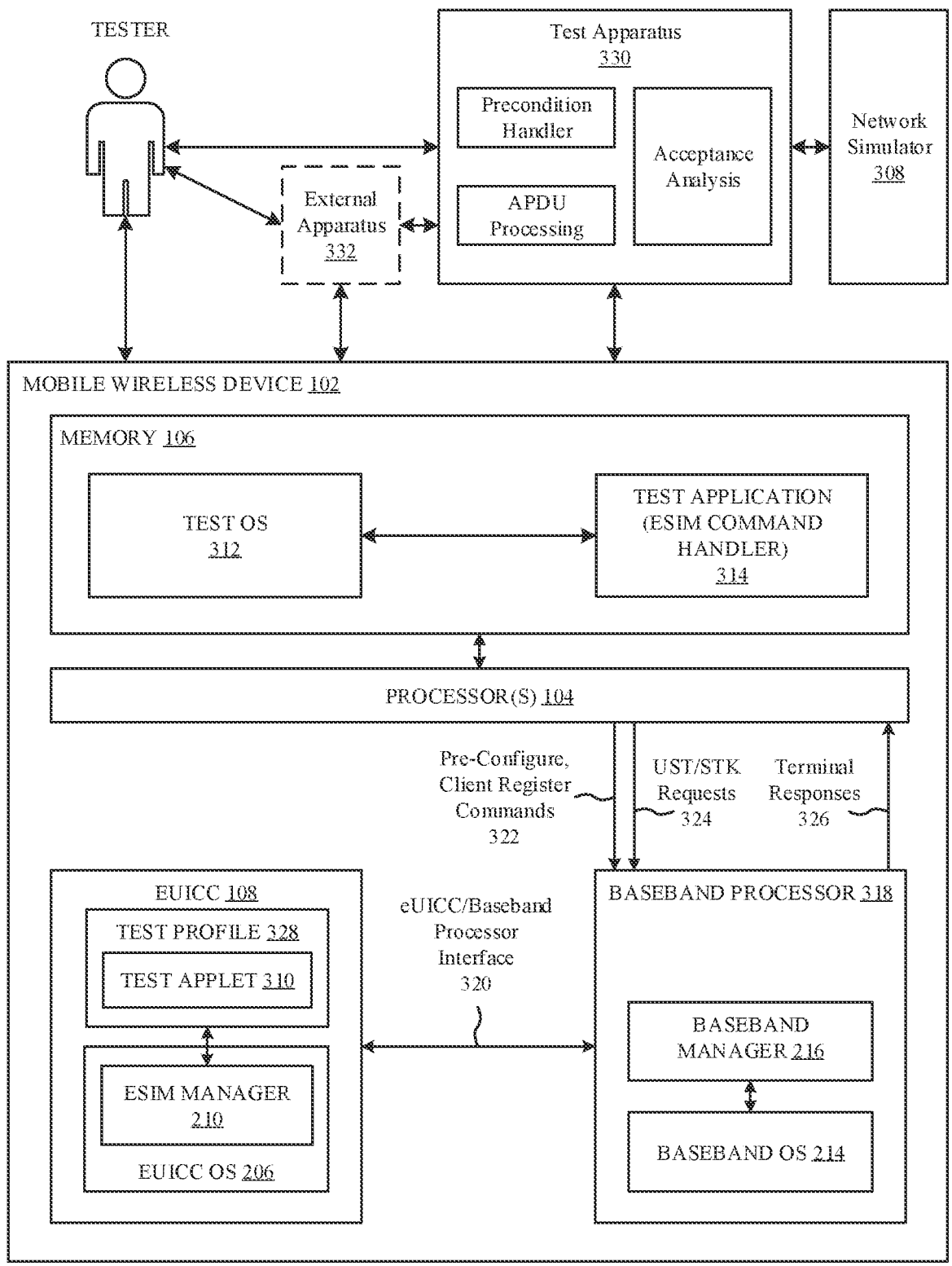
FIG. 3B illustrates an exemplary test setup for an eSIM-only wireless device, according to some embodiments.

FIG. 3B illustrates a diagram 350 of an eSIM 208 test setup for an eSIM-only wireless device 102 that includes a non-removable eUICC 108 on which one or more eSIMs 208 can be stored. For testing purposes, a test operating system (OS) 312 can be loaded to the memory 106 of the mobile wireless device 102 with a test application 314, also referred to as an eSIM 208 APDU command handler, which can execute on a processor 104 of the mobile wireless device 102. In some embodiments, the test application 314 can be embedded in the baseband processor 318. The test application 314 can register as a client with the baseband processor 318 and provide an interface with a test apparatus 330. The test application 314 can communicate client register commands and pre-configuration commands 322 to the baseband processor 318. The test application 314 can also send UST/STK requests to the baseband processor 318 and receive from the baseband processor 318 terminal responses 326. Communication between the test apparatus 330 and the test application 314 can be through a standard interface of the mobile wireless device 102 and/or via a test individual, who can interact with the mobile wireless device 102 via an input/output interface of the mobile wireless device 102 and with the test apparatus 330. In some embodiments, communication between the test apparatus 330 and the test application 314 can be through an optional external apparatus 332, with which the test individual can interact. In some embodiments, the test application (eSIM command handler) 314 can reside in the optional external apparatus 332 and communicate with the test apparatus 330 and the eUICC 108 of the mobile wireless device 102. The test apparatus can include multiple test elements, such as a precondition handler for setting up conditions for a test, an APDU processing element that parses data traffic received from the test application 314 to identify APDU commands and/or responses, and an acceptance analysis element that compares the APDU commands and/or responses parsed from the data traffic to determine whether the APDU commands and/or responses conform to a telecommunications test specification for a particular test scenario under study. The test apparatus 330 can be connected to a network simulator 308 for simulating cellular wireless network communication, such as when establishing mobile originated (MO) and/or mobile terminated (MT) calls. The test apparatus 330 can parse data packets that are specific to particular pre-configured items, such as pre-loaded proactive APDU commands, terminal responses, one or more events, terminal capability information, etc. The test apparatus 330 can decode the parsed data packets into user readable text to allow a user, e.g., a tester individual, to identify one or more APDU commands and/or responses exchanged between the baseband processor 318 and the eUICC 108. The test apparatus 330 can analyze the parsed and processed data packets to determine whether the mobile wireless device 102 with the eUICC 108 and pre-loaded test profile 328 passes or fails a particular test. Received APDU commands and/or responses can be displayed for review by the test individual on an interface of the mobile wireless device 102, on a display of the external apparatus 332, and/or on an interface of the test apparatus 330 in various embodiments.

The test application 314 can register as a client with the baseband processor 318 to allow for monitoring specific communication between the baseband processor 318 and the eUICC 108. The test application 314 can be restricted to access to only a subset of communication that occurs between the baseband processor 318 and the eUICC 108, e.g., to data traffic that is needed for verification of a test condition in a test specification. The baseband processor 318 can ensure that the test application 314 does not have unauthorized or unrestricted access to all data traffic between the baseband processor 318 and the eUICC 108 to ensure a level of security.

A test applet 310 (or multiple test applets 310) in a test profile 328 (or in multiple test profiles 328) in the eUICC 108 can include a generic set of elementary files (EFs) that can be configured by a tester and/or by the test apparatus 330 to include data for communicating with the baseband processor 318. In some embodiments, one or more test profiles 328 include one or more test applets 310 with pre-configured data embedded within when loaded (e.g., less or no pre-configuration required) for testing against one or more tests of a test specification. Communication by the test application 314 to the baseband processor 318 can include pre-configure commands 322 to set values within EFs of test applets 310 and client register commands 322 for establishing which data traffic to monitor for a test scenario. Communication by the test application 314 can also include configuring and/or retrieving Universal SIM (USIM) Service Table (UST) and/or SIM Toolkit (STK) proactive requests 324 or terminal responses 326. A UST can be configured specific to the test undertaken. A UST can represent services that a USIM supports and can be specifically altered for testing purposes. The baseband processor 318 can communicate terminal responses 326 back to the test application 314, which can send the terminal responses to the test apparatus 330 for parsing, decoding, and verification against expected results. In some embodiments, the test application 314 relays the data traffic (e.g., terminal responses 326) to the test apparatus 330 for processing. In some embodiments, the test application 314 processes the data traffic to produce an output on a display of the mobile wireless device 102, e.g., user-readable text that can be reviewed by the tester and/or input to the test apparatus 330. Additionally, individual test scenarios of USIM, USAT test specifications can be realized by loading one or more test profiles 328 that include one or more test applets 310 in the eUICC 108 of the mobile wireless device 102 and monitoring data traffic communicated via the eUICC/baseband processor interface 320, which can be selectively provided by the baseband processor 318 to the test application 314 and externally to the test apparatus 330 and tester for verification. Profiles can be loaded, in some embodiments, using a quick response (QR) code provided by the test apparatus 330 or manually via specific profile download commands by the mobile wireless device 102.

FIG. 4 illustrates a table 400 of an exemplary test sequence that can be realized using a test applet 310 in a test profile 328 loaded to an eUICC 108 of a mobile wireless device 102. Specific actions to realize the test sequence in an eSIM-only device are italicized in table 400. The test applet 310 can include elementary files that are configurable and can be triggered to cause actions based on the configuration. Initially, at step 1, rules for a test can be configured for a terminal and an always-on Internet protocol data unit (PDU) session can be configured for the terminal. (The mobile wireless device 102 can be considered the terminal.) Additionally, at step 1, a user, e.g., tester and/or test apparatus 330, can configure the test applet 310 of the eUICC 108 to include an OPEN CHANNEL proactive command in a particular elementary file of the test applet 310, e.g., in EF_STK, at a first record location, e.g., at record 1, and to include a CLOSE CHANNEL proactive command in the EF_STK at a second record location, e.g., at record 2. The EF_STK can include multiple records that each can be configured with a proactive APDU command. Loading the proactive commands to the EF_STK records allows for subsequent triggering of the proactive APDU commands to occur in accordance with an expected communication of a test condition. After configuration, at step 2, the mobile wireless device 102 can interact with the network simulator 308 via the test apparatus 330 to simulate registration of the mobile wireless device 102 with a next generation radio access network (NG-RAN) cell. At step 3, the always-on Internet PDU session can be successfully established, and the test application 314 (or an optional external apparatus 332) can send an STK request 324 to the baseband processor 318 to communicate to the test applet 310 to cause the set_STK EF to trigger the previously configured APDU command at record 1, namely the OPEN CHANNEL command. At step 4, the eUICC 108 indicates a proactive command is pending. At step 5, the baseband processor 318 retrieves the pending proactive command by sending a FETCH to the eUICC 108, which responds at step 6 with the OPEN CHANNEL proactive command previously triggered at step 3. At step 7, the baseband processor 318 can provide an indication to allow the mobile wireless device 102 to display information regarding the opening of the communication channel. At step 8, the mobile wireless device 102 sends a request to establish a PDU session to the network simulator 308 via the test apparatus 330 and receives, at step 9, in response an acceptance of the PDU establishment. At step 10, the OPEN CHANNEL can be indicated to the eUICC 108 by the baseband processor 318 as a terminal response, and the test application 314 (or the external apparatus 332) can send an STK request 324 to the baseband processor 318 to communicate to the test applet 310 to cause the set_STK_EF to trigger the previously configured APDU command at record 2, namely the CLOSE CHANNEL command. At step 11, the eUICC 108 indicates another proactive command is pending. At step 12, the baseband processor 318 retrieves the pending proactive command by sending a FETCH to the eUICC 108, which responds at step 13 with the CLOSE CHANNEL proactive command previously triggered at step 10. At step 14, the CLOSE CHANNEL can be indicated to the eUICC 108 by the baseband processor 318. The test sequence can conclude at step 15.

The test sequence summarized in table 400 includes an example of pre-configuring APDU commands in records of a first EF of a test applet 310 of a test profile 328, i.e., records in the EF_STK, where the APDU commands are later triggered in the test sequence by configuring a value in a second elementary file the EF_set_STK. Note that the EF_set_STK is used twice, first to trigger the OPEN CHANNEL APDU command stored at record 1 and second to trigger the CLOSE CHANNEL APDU command stored at record 2. The proactive commands can be relayed by the baseband processor 318 to the test application 314 for communication to the test apparatus 330 for verification that the mobile wireless device 102 operates as expected. The actual data traffic communicated between the eUICC 108 and the baseband processor 318 can be communicated for test apparatus 330 verification explicitly.

Figure 5:
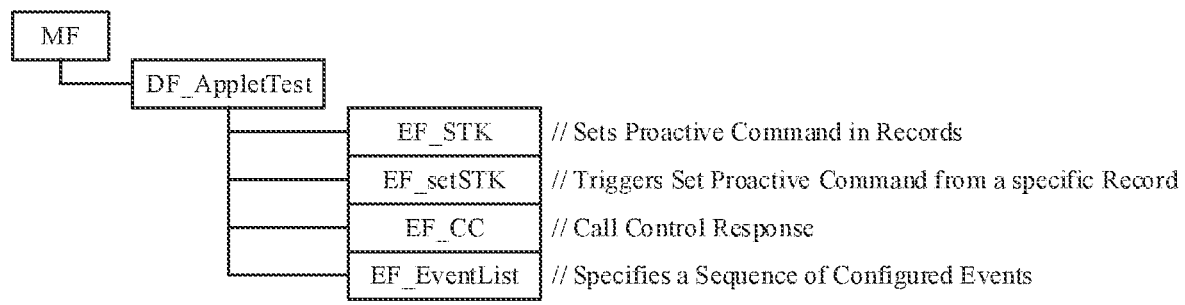
FIG. 5 illustrates an exemplary file structure for a generic applet format, according to some embodiments.

FIG. 5 illustrates a diagram 500 of a generic SIM toolkit (STK) applet file structure (at least in part) with a master file (MF), under which a dedicated file (DF) for a particular test applet resides (DF_AppletTest). The test applet can include several elementary files (EFs) including EF_STK that includes proactive APDU commands in individual records, where each record stores a particular proactive APDU command that can be later triggered. The test applet EFs further include the EF_setSTK that is used to trigger proactive commands previously loaded in a record of EF_STK. The EF_setSTK can configured to trigger a first proactive APDU command stored in a first record of EF_STK and then be re-configured to trigger a second proactive APDU command stored in a second record of EF_STK. For example, as illustrated in FIG. 4, configuring the EF_setSTK can be used to first trigger an OPEN CHANNEL command followed by a CLOSE CHANNEL command. The test applet EFs can further include EF_CC that stores one or more call control responses as needed for a particular test scenario. The test applet EFs can further include EF_EventList that specifies a sequence of configured events to be executed.

The elementary file EF_STK can be a linear fixed file of 255 bytes length that stores multiple records. Each record can be configured to hold a particular test's APDU command data that needs to be communicated by the eUICC 108 to the baseband processor 318 (acting as a "terminal") during a test. Multiple records can be pre-configured at the start of a test or based on the pre-loaded test applet with particular APDU command data. Individual records can then be triggered at appropriate times during the test to communicate the appropriate APDU command data.

The elementary file EF_setSTK can be a one-byte long file that stores a value for a record of the EF_STK to be triggered. The elementary file EF_setSTK can configured to trigger the record of the EF_STK designated by the stored record value to cause the stored APDU command data stored at that record to be communicated by the eUICC 108 to the baseband processor 318. For example, the hex value '0x01' can be stored in EF_setSTK, and the test applet can issue the APDU command stored at record '01' of EF_STK. As another example, the hex value '0x02' can be stored in EF_setSTK, and the test applet can issue the APDU command stored at record '02' of EF_STK. The elementary file EF_setSTK can be reconfigured multiple times during a test to cause different records to be triggered. In some embodiments, a particular value stored in the EF_setSTK can cause multiple records in the EF_STK to be triggered in a sequence. For example, the hex value '0x80' (or another designated hex value) can be stored in EF_setSTK, and the test applet can trigger all STK commands stored in EF_STK sequentially in order. If EF_STK has stored APDU commands in records 01 to 10, then storing '0x80' in EF_setSTK will cause the APDU commands in records 01 to 10 to be sent sequentially by the eUICC 108 to the baseband processor 318.

The elementary file EF_CC can be a 255-byte long file that stores call control responses as configured by a tester to process call control commands based on a call control configuration as required for a test scenario. The elementary file EF_EventList can be a 255-byte long file that stores events to be issued during a test scenario. EF_EventList can, in some embodiments, be formatted to include a length byte that specifies a number of configured events included in the EF, the length byte followed by the specific events in sequential order. The balance of the 255 bytes after the length byte and events can be padded with "0xFF" values to fill the EF. Exemplary supported events can be as defined in ETSI TS 102.223 and/or 3GPP 31.111 Section 8.25. Based on the event list configured in the EF, the test applet 310 can issue specific events at the beginning of a SIM tool kit test session. In some embodiments, configured data can persist in the eUICC 108 after a reset until cleared by a tester or by the test apparatus 330. In some embodiments, loading all bytes of the EF_EventList with '0xFF' values can clear the contents and indicate that the EF-EventList is not used for the test scenario.

Figure 6:
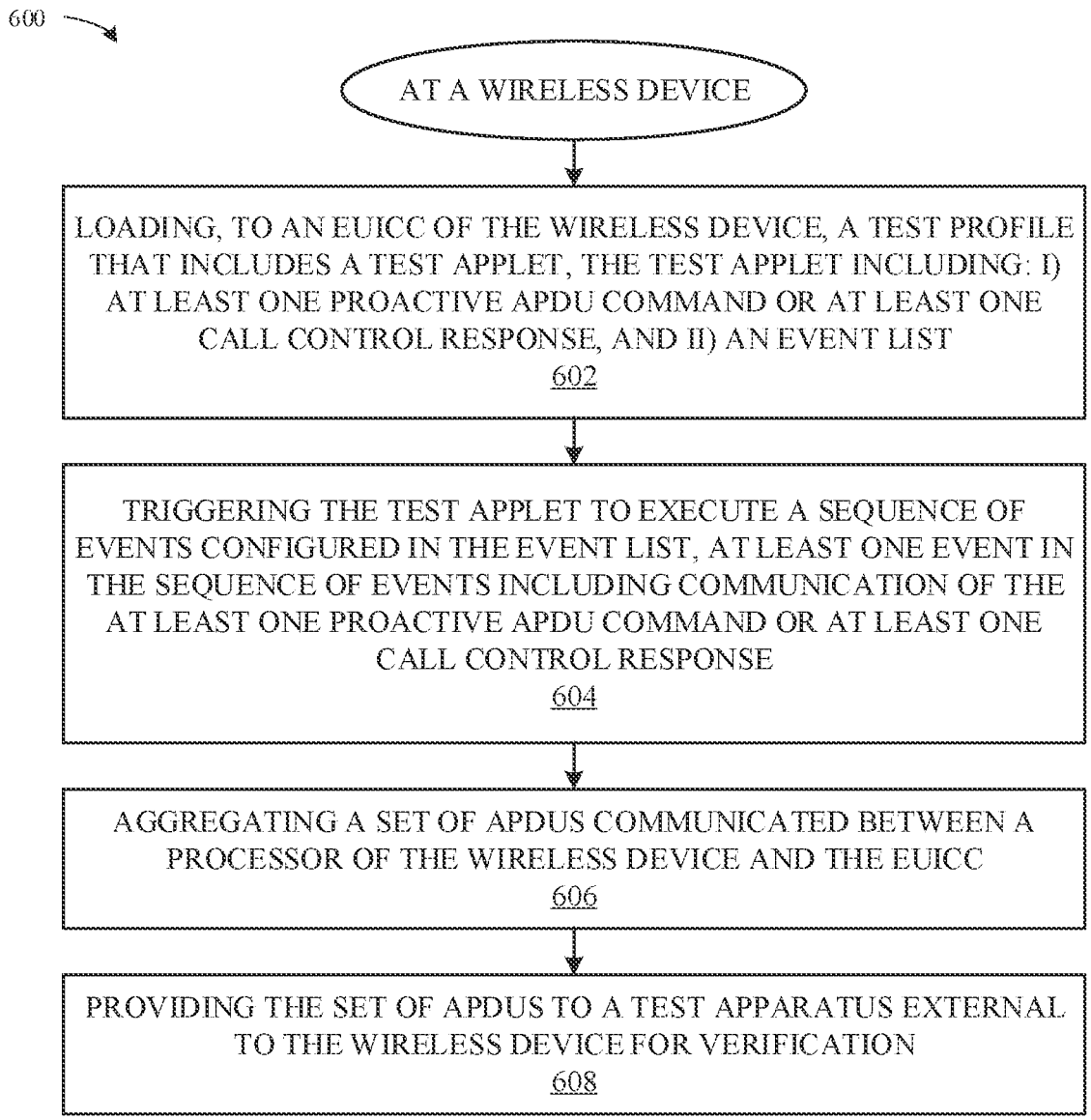
FIG. 6 illustrates a flowchart of an exemplary test procedure for testing an eSIM-only wireless device, according to some embodiments.

FIG. 6 illustrates a flowchart 600 of an exemplary set of actions performed by a wireless device 102 to perform a certification test for an eSIM-only wireless device 102. At 602, the wireless device 102 loads, to an eUICC 108 of the wireless device 102, a test profile 328 that includes a test applet 310, the test applet 310 including at least one proactive APDU command or at least one call control response APDU and an event list. At 604, the wireless device 102 triggers the test applet 310 to execute a sequence of events configured in the event list, at least one event in the sequence of events including communication of the at least one proactive APDU command or at least one call control response by the eUICC 108 to a processor external to the eUICC 108. At 606, the wireless device 102 aggregates a set of APDUs communicated between the processor external to the eUICC 108 and the eUICC 108. At 608, the wireless device 102 provides the set of APDUs to a test apparatus external to the wireless device 102 for verification against a test specification.

In some embodiments, a method for testing conformance of a mobile wireless device 102 to a test specification includes the mobile wireless device 102: i) loading, to an eUICC 108 of the mobile wireless device 102; a test profile 328 that includes a test applet 310, where the test applet 310 includes at least one proactive application protocol data unit (APDU) command or at least one call control response and an event list, ii) triggering the test applet 310 to execute a sequence of events configured in the event list, at least one event in the sequence of events including communication of the at least one proactive APDU command or the at least one call control response from the eUICC 108 to a processor of the mobile wireless device 102 external to the eUICC 108; iii) aggregating a set of APDUs communicated between the processor of the mobile wireless device 102 and the eUICC 108 during execution of the sequence of events; and iv) providing the set of APDUs to a test apparatus external to the mobile wireless device 102 for verification in accordance with the test specification. In some embodiments, the method further includes an eSIM 208 command handler resident on the processor of the mobile wireless device 102 initializing the eUICC 108 to an initial condition, e.g., by triggering the test applet. In some embodiments, initialization of the eUICC 108 includes resetting the test profile to a set of default values. In some embodiments, the method further includes caching, by the eSIM command handler, a set of default values for loading to the test profile prior to triggering the test applet. In some embodiments, the method further includes the eSIM command handler monitoring file changes in the test profile, and the eSIM command handler reverting the test profile to an applicable initial condition after completion of a test using the test profile. In some embodiments, the eSIM command handler is further configured to process and/or identify one or more APDU commands of the set of APDUs communicated between the processor of the mobile wireless device 102 and the eUICC 108. In some embodiments: i) the mobile wireless device 102 is a multi-SIM (MSIM) capable device, ii) a primary test profile and a secondary test profile are enabled on the eUICC 108 simultaneously; iii) the eSIM command handler processes APDU commands and/or responses for each of the primary test profile and the secondary test profile individually; and iv) the eSIM command handler configures APDU commands for each of the primary test profile and the secondary test profile separately.

In some embodiments, an optional external apparatus 332 communicatively coupled to the eUICC 108 of the mobile wireless device 102 and to a test apparatus 330, can be used to perform various operations for testing the eUICC 108 of the mobile wireless device 102 as discussed herein. In some embodiments, the external apparatus 332 can be used to perform one or more of: i) initializing the eUICC 108 to an initial condition, ii) caching default values for a test profile, iii) modifying file contents in the test profile, iv) monitoring file changes in the test profile, v) reverting the test profile to an initial condition, vi) processing and/or identifying APDU commands and/or responses communicated between the processor of the mobile wireless device 102 and the eUICC 108, vii) configuring APDU commands for test profiles, viii)

aggregating APDU commands and/or responses, or ix) providing APDU commands and/or responses to the test apparatus 330.

In some embodiments, a test profile includes a test applet that includes an event list, where the test profile is loaded to an eUICC 108 of a mobile wireless device 102, e.g., by an eSIM APDU command handler, which can be resident on a baseband processor of the mobile wireless device 102, on another processor of the mobile wireless device 102, or on an external apparatus 332 communicatively couple to the mobile wireless device 102. In some embodiments, the external apparatus 332 loads the test profile to the eUICC 108 of the mobile wireless device 102, independent of a location of the eSIM APDU command handler. In some embodiments, execution of the test applet on the eUICC 108 of the mobile wireless device 102 causes the eUICC 108 to execute a sequence of events configured in the event list, where at least one event in the sequence of events including communication of at least one proactive APDU command and/or at least one call control response from the eUICC 108 to a processor of the mobile wireless device 102 external to the eUICC 108. The eSIM APDU command handler and/or the external apparatus 332 can aggregate one or more APDU commands and/or responses, such as the at least one proactive APDU command and/or the at least one call control response, communicated between the processor of the mobile wireless device 102 and the eUICC 108 during execution of the sequence of events. The eSIM APDU command handler and/or the external apparatus 332 can provide the set of APDUs (commands and/or responses) to a test apparatus 330 external to the mobile wireless device 102 for verification in accordance with the test specification.

Figure 7:
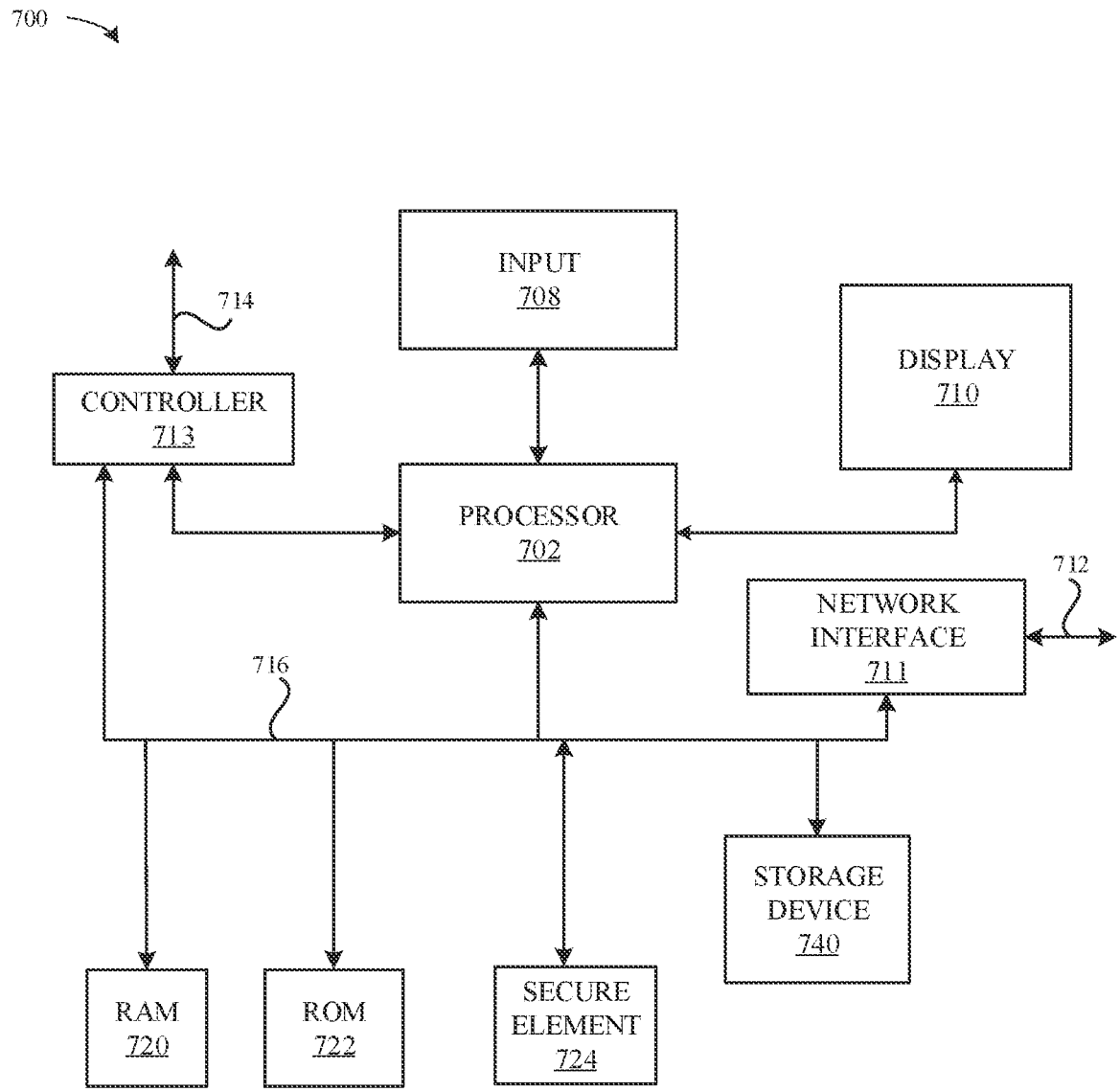
FIG. 7 illustrates a block diagram of exemplary elements of a mobile wireless device, according to some embodiments.

FIG. 7 illustrates a detailed view of a representative computing device 700 that can be used to implement various methods described herein, according to some embodiments. In particular, the detailed view illustrates various components that can be included in the mobile wireless device 102. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 724, which can represent secure storage for cellular wireless system access by the mobile wireless device 102, such as an eUICC 108 on which to store one or more eSIMs 208 and/or a UICC 118 on which to store a pSIM.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for testing conformance of a mobile wireless device to a test specification, the method comprising:
by the mobile wireless device:
loading, to an embedded universal integrated circuit card (eUICC) of the mobile wireless device, a test profile that includes a test applet, where the test applet includes:
at least one proactive application protocol data unit (APDU) command or at least one call control response, and
an event list;
triggering the test applet to execute a sequence of events configured in the event list, at least one event in the sequence of events including communication of the at least one proactive APDU command or the at least one call control response from the eUICC to a processor of the mobile wireless device external to the eUICC;
aggregating a set of APDUs communicated between the processor of the mobile wireless device and the eUICC during execution of the sequence of events; and
providing the set of APDUs to a test apparatus external to the mobile wireless device for verification in accordance with the test specification.

2. The method of claim 1, further comprising:
initializing, by an embedded subscriber identity module (eSIM) command handler resident on the processor of the mobile wireless device, the eUICC to an initial condition.

3. The method of claim 2, wherein initialization of the eUICC includes resetting the test profile to a set of default values.

4. The method of claim 2, further comprising:
caching, by the eSIM command handler, a set of default values for loading to the test profile prior to triggering the test applet.

5. The method of claim 2, further comprising:
by the eSIM command handler:
monitoring file changes in the test profile; and
reverting the test profile to an applicable initial condition after completion of a test using the test profile.

6. The method of claim 2, wherein the eSIM command handler is further configured to process and/or identify one or more APDU commands or responses of the set of APDUs communicated between the processor of the mobile wireless device and the eUICC.

7. The method of claim 2, wherein:
the mobile wireless device is a multi-SIM (MSIM) capable device;
a primary test profile and a secondary test profile are enabled on the eUICC simultaneously;
the eSIM command handler processes APDU commands or responses for each of the primary test profile and the secondary test profile individually; and
the eSIM command handler configures APDU commands for each of the primary test profile and the secondary test profile separately.

8. A mobile wireless device configured for conformance testing to a test specification, the mobile wireless device comprising:
an embedded universal integrated circuit card (eUICC);
one or more antennas; and
one or more processors communicatively coupled to the one or more antennas and to a memory storing instructions that, when executed by the one or more processors, configure the mobile wireless device to:
load, to the eUICC, a test profile that includes a test applet, where the test applet includes:
at least one proactive application protocol data unit (APDU) command or at least one call control response, and
an event list;
trigger the test applet to execute a sequence of events configured in the event list, at least one event in the sequence of events including communication of the at least one proactive APDU command or the at least one call control response from the eUICC to a processor of the one or more processors;
aggregate a set of APDUs communicated between the processor and the eUICC during execution of the sequence of events; and
provide the set of APDUs to a test apparatus external to the mobile wireless device for verification in accordance with the test specification.

9. The mobile wireless device of claim 8, wherein the mobile wireless device is further configured to:
initialize, by an embedded subscriber identity module (eSIM) command handler resident on the processor, the eUICC to an initial condition.

10. The mobile wireless device of claim 9, wherein initialization of the eUICC includes resetting the test profile to a set of default values.

11. The mobile wireless device of claim 9, wherein the mobile wireless device is further configured to:
cache, by the eSIM command handler, a set of default values for loading to the test profile prior to triggering the test applet.

12. The mobile wireless device of claim 9, wherein the eSIM command handler is further configured to:
monitor file changes in the test profile; and
revert the test profile to an applicable initial condition after completion of a test using the test profile.

13. The mobile wireless device of claim 9, wherein the eSIM command handler is further configured to process and/or identify one or more APDU commands or responses of the set of APDUs communicated between the processor of the mobile wireless device and the eUICC.

14. The mobile wireless device of claim 9, wherein:
the mobile wireless device is a multi-SIM (MSIM) capable device;
a primary test profile and a secondary test profile are enabled on the eUICC simultaneously;
the eSIM command handler processes APDU commands or responses for each of the primary test profile and the secondary test profile individually; and
the eSIM command handler configures APDU commands or responses for each of the primary test profile and the secondary test profile separately.

15. A non-transitory computer-readable medium storing instructions for testing conformance of a mobile wireless device to a test specification, wherein execution of the instructions on one or more processors of the mobile wireless device, configure the mobile wireless device to:
load, to an embedded universal integrated circuit card (eUICC), a test profile that includes a test applet, where the test applet includes:
at least one proactive application protocol data unit (APDU) command or at least one call control response, and
an event list;
trigger the test applet to execute a sequence of events configured in the event list,
at least one event in the sequence of events including communication of the at least one proactive APDU command or the at least one call control response from the eUICC to a processor of the one or more processors;
aggregate a set of APDUs communicated between the processor and the eUICC during execution of the sequence of events; and
provide the set of APDUs to a test apparatus external to the mobile wireless device for verification in accordance with the test specification.

16. The non-transitory computer-readable medium of claim 15, wherein the mobile wireless device is further configured to:
initialize, by an embedded subscriber identity module (eSIM) command handler resident on the processor, the eUICC to an initial condition.

17. The non-transitory computer-readable medium of claim 16, wherein the mobile wireless device is further configured to:
cache, by the eSIM command handler, a set of default values for loading to the test profile prior to triggering the test applet.

18. The non-transitory computer-readable medium of claim 16, wherein the eSIM command handler is further configured to:
monitor file changes in the test profile; and
revert the test profile to an applicable initial condition after completion of a test using the test profile.

19. The non-transitory computer-readable medium of claim 16, wherein the eSIM command handler is further configured to process and/or identify one or more APDU commands or responses of the set of APDUs communicated between the processor of the mobile wireless device and the eUICC.

20. The non-transitory computer-readable medium of claim 16, wherein:
the mobile wireless device is a multi-SIM (MSIM) capable device;
a primary test profile and a secondary test profile are enabled on the eUICC simultaneously;
the eSIM command handler processes APDU commands or responses for each of the primary test profile and the secondary test profile individually; and
the eSIM command handler configures APDU commands for each of the primary test profile and the secondary test profile separately.

* * * * *